Patented Sept. 13, 1938

2,130,103

UNITED STATES PATENT OFFICE 2,130,103

STORAGE BATTERY PLATE AND COMPOSITION THEREFOR

John A. Schaeffer and Harold R. Harner, Joplin, Mo., assignors to The Eagle-Picher Lead Company, Cincinnati, Ohio, a corporation of Ohio No Drawing. Application April 10, 1935, Serial No. 15,629

8 Claims. (Cl. 136—26)

The present invention relates to storage battery plates of the lead-acid type and more particularly to negative plates when formed of a novel composition of active material in paste form.

One of the objects of this invention is to provide a negative storage battery plate having an increased initial capacity under conditions of high rate and low temperature discharge, which capacity shall be maintained over a longer period of useful life than would be the case with plates of previously known types.

A further object of our invention is the provision of a negative storage battery plate in which the active mass of the battery includes a precipitate formed by the interaction of hymatomelanic acid with the lead paste and with the surface of the grid. This precipitate is, generally speaking, a lead salt of hymatomelanic acid insoluble in the sulphuric acid which forms the electrolyte of the battery. However, this precipitate is part of the active mass of the paste in that it responds to the cycling of the battery absorbing electric energy during the charge and delivering it on discharge. This lead salt, however, does not become inactive readily under normal conditions of use and in fact will retard the development of inactive lead compounds in the active mass.

Among the objects of our invention is the use in the active mass of the battery, of a substance which gives this mass increased colloidal porosity. This assists in rendering the active mass of the plate readily accessible to the electrolyte giving the plate an added measure of capacity. Also it serves to prevent the conversion of the active mass into inactive lead compounds and under severe conditions of operation keeps down the temperature induced in the cell and likewise prevents buckling or physical damage to the plates.

Other objects will be apparent from the following description of the preferred form of our invention and it will be evident that it provides the maximum simplicity, efficiency and economy in the construction and use of such storage battery plates.

The invention is based upon our discovery that the active material of a negative storage battery plate can be given increased initial capacity particularly as regards high rate and low temperature discharge and long life at maximum efficiency by the addition to the active material of a relatively small proportion of hymatomelanic acid or the development in the active material of an insoluble salt of this acid.

Hymatomelanic acid occurs as one of the products of decomposition of plant life and can be generally described as one form of humus. Its occurrence and mode of preparation have been known for many years and are summarized by Sven Oden, in Die Huminsauren, 2d edition, published by T. Steinkopff Verlag, Dresden and Leipzig, 1922, p. 108. Vegetable materials when subjected to decomposition progress through a series of reactions caused by molds, bacteria and various other ferments and micro-organisms with or without the presence of oxygen. In the course of this decomposition, a certain part of the vegetable matter is broken down into soluble forms of varying chemical constitution. This converted material may then be separated from the residual vegetable matter (humin) by extraction with dilute alkali solutions and in turn may be separated into several substances of distinct and characteristic properties.

That form of decomposition product soluble in alkali but insoluble in water or alcohol has been termed humic acid. It is to be distinguished from hymatomelanic acid in that the latter is soluble in alcohol. A further distinction resides in the fact that the hymatomelanic acid has relatively less nitrogen content and greater carbon content. Also in this acid there is a practical freedom from hemi-celluloses which are present in larger quantities in the so-called humic acid. In short, the alkali soluble fraction precipitated by acid and soluble in alcohol, namely, the so-called hymatomelanic acid, is a ligno-protein complex with a relatively low content of protein, a higher concentration of carbon, and is practically free from hemi-celluloses.

This acid, being soluble in alkali, is precipitated from solution by the addition of acids and advantage is taken of this fact in the production of our novel composition for battery plates.

When the material precipitated from the total humus extract by means of acids, such as sulphuric or other mineral acids, is then extracted with an alcohol such as methyl or ethyl alcohol, then the hymatomelanic acid is obtained in soluble form free from such impurities as hemi-celluloses which would interfere with its use as a battery paste expander.

Other re-agents, such as acetone and other alcohols and ketones may be used for this purification. The free hymatomelanic acid is then prepared from the alcohol solution by evaporation and removal of the solvent. When mixed with a lead compound or plurality of lead compounds, made into a paste with suitable vehicle such as sulphuric acid and applied to storage battery grids, the hymatomelanic acid reacts with the lead to form a compound which serves as a binder between the paste and the surface of the grid. It also has the excellent and desirable property of improving the initial capacity of the battery and prolonging the effective capacity through its life. The hymatomelanic acid is insoluble in the electrolyte so that the advantages are permanent.

Some or all of the hymatomelanic material may be introduced in the form of a lead hymatomelanate consisting of the precipitate formed as the reaction product of litharge or a soluble salt of lead and a solution or suspension of hymatomelanic acid, or a salt thereof.

This hymatomelanic acid reacts with lead in the presence of the electrolyte to form an insoluble lead salt. This reaction occurs whether the acid in precipitated form is mixed with an oxide of lead and then treated with sulphuric acid or alternatively if the soluble alkaline form of the acid is worked into the lead paste and then the lead salt produced in insoluble form by subjection to the effect of the sulphuric acid or the charging electrolyte.

In practice it is preferred to mix a lead compound, or mixture of lead compounds, with hymatomelanic acid, or a suitable salt of hymatomelanic acid, as for instance any of the following: lead hymatomelanate, sodium hymatomelanate, ammonium hymatomelanate. This is made into a paste with a suitable vehicle, applied to negative storage battery grids, and treated in suitable ways in the usual process. Various modifications of this procedure will occur to one skilled in the art, the invention being to cover all such modifications.

The amount of hymatomelanic acid needed varies with the results desired, and the lead materials being used. Good results have been obtained by the mixture of substantially one hundred parts by weight of a lead compound, or mixture of lead compounds, and 0.1 part of hymatomelanic acid, although this is to be taken as illustrative only and not as limiting the scope of this invention to the proportions thus stated by way of example. The acid may be increased to one percent with advantage under some circumstances.

As above described the invention is characterized by the use of a biologically modified or humified ligno-protein expander soluble in alcohol, insoluble in acid and practically free from hemi-celluloses which would be subject to further breaking down under the acid and electrical conditions of the battery. It withstands the tendency for distortion or buckling and resists the development of inactive forms of lead.

The expander is also of such porous colloidal character as to permit the maximum of contact between the electrolyte and the superficial area of the active material.

Although the disclosure of the above is that of the preferred embodiment, it will be readily understood that the invention is susceptible to considerable modification and change and comprehends other details and procedures without departing from the spirit of the invention defined in the following claims.

What we claim as our invention is:

1. A composition for a negative storage battery plate consisting of an oxide of lead and an hymatomelanic acid expander soluble in alcohol and practically free from hemicelluloses.

2. A composition for a negative storage battery plate consisting of an oxide of lead having evenly distributed therethrough a relatively small proportion of hymatomelanic acid.

3. A composition for a negative storage battery plate comprising an oxide of lead and an organic expander consisting of a compound of hymatomelanic acid with a lead radical.

4. A composition for a negative storage battery plate consisting of an oxide of lead and a lead salt of hymatomelanic acid.

5. A composition for a negative storage battery plate consisting of lead in active form and an organic compound of hymatomelanic acid with a lead radical insoluble in sulphuric acid.

6. A composition for a negative storage battery plate consisting of a lead paste having evenly distributed therein an organic compound of hymatomelanic acid with a lead radical amounting to less than one percent by weight of the lead paste.

7. A composition for a negative storage battery plate consisting of a lead paste having evenly distributed therein between one tenth of one percent and one percent by weight of an organic compound of hymatomelanic acid with a lead radical.

8. A negative storage battery plate having an inert metal grid filled with an active lead mass containing evenly distributed therein a porous expander consisting of the organic reaction product between hymatomelanic acid and lead in the presence of sulphuric acid.

JOHN A. SCHAEFFER.
HAROLD R. HARNER.